(12) United States Patent
Honda et al.

(10) Patent No.: US 12,385,661 B2
(45) Date of Patent: Aug. 12, 2025

(54) AIR-CONDITIONING APPARATUS

(71) Applicant: Mitsubishi Electric Corporation, Tokyo (JP)

(72) Inventors: Kazuya Honda, Tokyo (JP); Naofumi Takenaka, Tokyo (JP); Jumpei Takagi, Tokyo (JP); Masafumi Tomita, Tokyo (JP); Mizuo Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 206 days.

(21) Appl. No.: 18/277,583

(22) PCT Filed: Mar. 18, 2021

(86) PCT No.: PCT/JP2021/010974
§ 371 (c)(1),
(2) Date: Aug. 17, 2023

(87) PCT Pub. No.: WO2022/195791
PCT Pub. Date: Sep. 22, 2022

(65) Prior Publication Data

US 2024/0133573 A1  Apr. 25, 2024
US 2024/0230137 A9  Jul. 11, 2024

(51) Int. Cl.
*F24F 11/65* (2018.01)
*F24F 1/0083* (2019.01)
(Continued)

(52) U.S. Cl.
CPC ............ *F24F 11/65* (2018.01); *F24F 1/0083* (2019.02); *F24F 11/0008* (2013.01); *F24F 2110/20* (2018.01)

(58) Field of Classification Search
CPC ........ F24F 11/65; F24F 11/0008; F24F 11/46; F24F 11/86; F24F 11/30; F24F 11/64;
(Continued)

(56) References Cited

U.S. PATENT DOCUMENTS

2007/0180851 A1* 8/2007 Fujiyoshi ............... F24F 3/1411
62/480
2010/0242508 A1* 9/2010 Lifson .................... F24F 3/1405
62/115
(Continued)

FOREIGN PATENT DOCUMENTS

JP  2002-054832 A  2/2002
JP  2011-075179 A  4/2011
(Continued)

OTHER PUBLICATIONS

International Search Report and Written Opinion mailed on May 25, 2021, received for PCT Application PCT/JP2021/010974, filed on Mar. 18, 2021, 8 pages including English Translation.

*Primary Examiner* — Nelson J Nieves
(74) *Attorney, Agent, or Firm* — XSENSUS LLP

(57) ABSTRACT

An air-conditioning apparatus includes configured to, when a cooling operation mode is changed into one of multiple dehumidifying operation modes, select the one of the multiple dehumidifying operation modes on the basis of a value of a sensible heat ratio difference ΔSHF that is a difference between a target sensible heat ratio acquired from an indoor temperature detected by an indoor temperature sensor, a target indoor temperature, and target indoor humidity and a theoretical minimum possible sensible heat ratio acquired from enthalpy of an indoor air, enthalpy of blown air from the indoor unit when relative humidity is 100%, and enthalpy of sensible heat.

13 Claims, 10 Drawing Sheets

(51) Int. Cl.
*F24F 11/00* (2018.01)
*F24F 110/20* (2018.01)

(58) Field of Classification Search
CPC ...... F24F 11/74; F24F 1/0083; F24F 2110/20; F24F 2110/10; F24F 3/14
See application file for complete search history.

(56) References Cited

U.S. PATENT DOCUMENTS

| | | |
|---|---|---|
| 2016/0178222 A1* | 6/2016 | Bush ........................ F24F 11/46 62/176.1 |
| 2017/0159964 A1* | 6/2017 | Arai ......................... F24F 11/81 |
| 2020/0271346 A1* | 8/2020 | Nakajima ................. F24F 11/64 |
| 2021/0222905 A1* | 7/2021 | Morioka .................. F24F 11/65 |
| 2022/0228765 A1* | 7/2022 | Kulandaisamy ......... F24F 11/86 |

FOREIGN PATENT DOCUMENTS

| | | |
|---|---|---|
| JP | 5487857 B2 | 5/2014 |
| JP | 2014-153008 A | 8/2014 |

* cited by examiner

AIR-CONDITIONING APPARATUS

CROSS-REFERENCE TO RELATED APPLICATION

The present application is based on PCT filing PCT/JP2021/010974, filed Mar. 18, 2021, the entire contents of which are incorporated herein by reference.

TECHNICAL FIELD

The present disclosure relates to an air-conditioning apparatus that performs a dehumidifying operation.

BACKGROUND ART

An air-conditioning apparatus controls the rotation frequency of a compressor such that an indoor temperature approaches a predetermined temperature during a cooling operation. As a temperature difference between the predetermined temperature and the indoor temperature decreases, the rotation frequency of the compressor decreases, and an evaporating temperature in an indoor heat exchanger becomes more than or equal to the dew point of indoor air. This poses a problem in that dehumidification is not performed and comfort is reduced. In view of this, during a cooling operation, a known air-conditioning apparatus sets the evaporating temperature of refrigerant at which a sensible heat ratio in the indoor heat exchanger is less than or equal to a predetermined reference value to the maximum possible evaporating temperature and controls the evaporating temperature of the refrigerant in the indoor heat exchanger within the range of the maximum possible evaporating temperature or less (see, for example, Patent Literature 1).

CITATION LIST

Patent Literature

Patent Literature 1: Japanese Patent No. 5487857

SUMMARY OF INVENTION

Technical Problem

In the air-conditioning apparatus disclosed in Patent Literature 1, however, the evaporating temperature is set on the basis of the sensible heat ratio in the indoor heat exchanger, and for this reason, the evaporating temperature may greatly decrease to ensure the amount of dehumidification in some cases. This poses a problem in that the indoor temperature greatly decreases and user comfort is reduced.

The present disclosure has been accomplished to solve the above problems, and it is an object to provide an air-conditioning apparatus that can perform a dehumidifying operation without reducing user comfort.

Solution to Problem

An air-conditioning apparatus according to an embodiment of the present disclosure includes an indoor unit including an indoor heat exchanger, an indoor fan configured to send indoor air to the indoor heat exchanger, and an indoor temperature sensor configured to detect an indoor temperature, the indoor unit being installed in an indoor space, an outdoor unit including a compressor and an outdoor heat exchanger, the outdoor unit being installed outside the indoor space, a refrigerant circuit in which the compressor, the outdoor heat exchanger, an expansion device, and the indoor heat exchanger are connected by a pipe, and a controller having a cooling operation mode in which the indoor space is cooled and multiple dehumidifying operation modes in which the indoor space is dehumidified. The multiple dehumidifying operation modes include a first dehumidifying operation mode in which an air volume of the indoor fan is increased or decreased and a second dehumidifying operation mode in which the compressor alternates between operation and suspension. The controller is configured to, when the cooling operation mode is changed into one of the multiple dehumidifying operation modes, select the one of the multiple dehumidifying operation modes on the basis of a value of a sensible heat ratio difference $\Delta SHF$ that is a difference between a target sensible heat ratio acquired from the indoor temperature detected by the indoor temperature sensor, a target indoor temperature, and target indoor humidity and a theoretical minimum possible sensible heat ratio acquired from enthalpy of the indoor air, enthalpy of blown air from the indoor unit when relative humidity is 100%, and enthalpy of sensible heat.

Advantageous Effects of Invention

In the air-conditioning apparatus according to an embodiment of the present disclosure, the controller is configured to, when the cooling operation mode is changed into one of the multiple dehumidifying operation modes, select the one of the multiple dehumidifying operation modes having different dehumidifying capacities on the basis of the value of the sensible heat ratio difference $\Delta SHF$, which is a difference between the target sensible heat ratio and the theoretical minimum possible sensible heat ratio. This enables a dehumidifying operation mode suited to dehumidification to be selected, prevents the evaporating temperature from greatly decreasing, and enables dehumidification to be performed without reducing user comfort.

DESCRIPTION OF EMBODIMENTS

Embodiments of the present disclosure will hereinafter be described with reference to the drawings. The present disclosure is not limited by the embodiments described below. The relationship between the sizes of components in some drawings described below may differ from the relationship between the sizes of actual ones in some cases.

Embodiment 1

[Air-Conditioning Apparatus]

Figure 1:
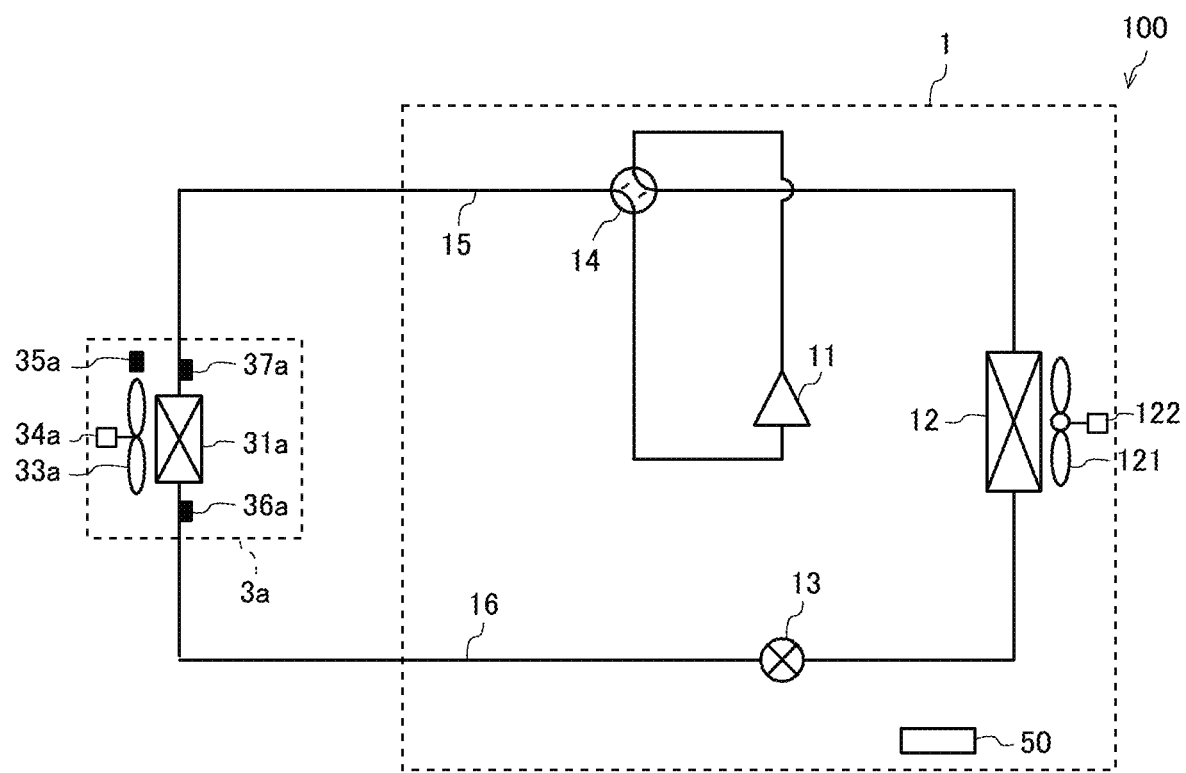
FIG. 1 is a refrigerant circuit diagram illustrating an example of the structure of an air-conditioning apparatus according to Embodiment 1.

FIG. 1 is a refrigerant circuit diagram illustrating an example of the structure of an air-conditioning apparatus 100 according to Embodiment 1.

As illustrated in FIG. 1, the air-conditioning apparatus 100 according to Embodiment 1 includes an outdoor unit 1 and an indoor unit 3a. The outdoor unit 1 and the indoor unit 3a are connected to each other by a gas pipe 15 and a liquid pipe 16 and are included in a refrigerant circuit.

[Outdoor Unit]

The outdoor unit 1 is installed, for example, outside a room and removes or provides heat for air conditioning. For example, the outdoor unit 1 includes a compressor 11, a flow switching device 14, an outdoor heat exchanger 12, and an expansion device 13, which are connected by pipes. The outdoor unit 1 includes an outdoor fan 121 that sends air to the outdoor heat exchanger 12. The expansion device 13 may be included in the indoor unit 3a instead of in the outdoor unit 1. The compressor 11 sucks and compresses refrigerant into high-temperature and high-pressure refrigerant and is, for example, an inverter compressor, which has a controllable capacity. The flow switching device 14 switches between a refrigerant flow path for a cooling operation and a refrigerant flow path for a heating operation and changes a heat exchanger that serves as a condenser or a gas cooler. During the cooling operation, the flow switching device 14 is switched such that a discharge port of the compressor 11 is in communication with the outdoor heat exchanger 12 and such that the gas pipe 15 is in communication with a suction port of the compressor 11. Consequently, the outdoor heat exchanger 12 serves as the condenser or the gas cooler. During the heating operation, the flow switching device 14 is switched such that the discharge port of the compressor 11 is in communication with the gas pipe 15 and such that the outdoor heat exchanger 12 is in communication with the suction port of the compressor 11. Consequently, the outdoor heat exchanger 12 serves as an evaporator. The flow switching device 14 is a four-way valve but is not limited to a four-way valve. The flow switching device 14 may include a device such as a two-way valve.

The outdoor heat exchanger 12 exchanges heat between air and the refrigerant and consequently condenses or evaporates the refrigerant. The outdoor fan 121 sends outdoor air to the outdoor heat exchanger 12. The outdoor fan 121 is driven by an outdoor fan motor 122. The expansion device 13 decompresses and expands the refrigerant and is, for example, an electronic expansion valve, which has an adjustable expansion opening degree.

[Indoor Unit]

The indoor unit 3a is installed, for example, inside a room and supplies air for air conditioning to an indoor space. The indoor unit 3a includes an indoor heat exchanger 31a. The indoor unit 3a also includes an indoor fan 33a that sends air to the indoor heat exchanger 31a.

The indoor heat exchanger 31a exchanges heat between air and the refrigerant, consequently condenses or evaporates the refrigerant, and generates heating air or cooling air to be supplied to the indoor space. The indoor fan 33a sends indoor air to the indoor heat exchanger 31a. The indoor fan 33a is driven by an indoor fan motor 34a.

The indoor unit 3a also includes an indoor temperature sensor 35a, an entrance temperature sensor 36a, and an exit temperature sensor 37a. The indoor temperature sensor 35a is, for example, a thermistor and detects an indoor temperature Ta. The indoor temperature sensor 35a is disposed at an air inlet of the indoor unit 3a for the indoor air. The entrance temperature sensor 36a is, for example, a thermistor and detects the temperature of the refrigerant that flows into the indoor heat exchanger 31a during the cooling operation. The entrance temperature sensor 36a is disposed at the entrance of the indoor heat exchanger 31a for the refrigerant during the cooling operation. The exit temperature sensor 37a is, for example, a thermistor and detects the temperature of the refrigerant that flows out from the indoor heat exchanger 31a during the cooling operation. The exit temperature sensor 37a is disposed at the exit of the indoor heat exchanger 31a for the refrigerant during the cooling operation.

The refrigerant circuit of the air-conditioning apparatus 100 according to Embodiment 1 is formed by connecting the compressor 11, the flow switching device 14, the outdoor heat exchanger 12, the expansion device 13, and the indoor heat exchanger 31a in this order by the pipes.

The air-conditioning apparatus 100 also includes a controller 50. The controller 50 controls, for example, the entire air-conditioning apparatus 100 and includes, for example, an analog circuit, a digital circuit, a CPU, or a combination of two of these. The controller 50 controls, for example, the driving frequency of the compressor 11, turning on and off of the indoor fan 33a and the outdoor fan 121, the rotation frequencies of the indoor fan 33a and the outdoor fan 121, switching of the flow switching device 14, and the opening degree of the expansion device 13, for example, on the basis of information that is detected by the sensors described above and an instruction from an input device such as a remote controller and activates operation modes described later. In FIG. 1, the outdoor unit 1 includes the controller 50, but this is not a limitation. The indoor unit 3a may include the controller 50, and the outdoor unit 1 and the indoor unit 3a may also include the respective controllers 50.

[Operation Modes of Air-conditioning Apparatus]

The operation modes in which the air-conditioning apparatus 100 operates will be described below.

The air-conditioning apparatus 100 has a cooling operation mode and dehumidifying operation modes. The flow of the refrigerant and the state of the refrigerant in each operation mode will be described below.

[Cooling Operation Mode] The cooling operation mode in which the indoor heat exchanger 31a of the air-conditioning apparatus 100 according to Embodiment 1 generates a cooling load will be described.

The flow of the refrigerant will first be described. The compressor 11 sucks and compresses low-temperature and low-pressure gas refrigerant and discharges high-temperature and high-pressure gas refrigerant. The high-temperature and high-pressure gas refrigerant that is discharged from the compressor 11 flows into the outdoor heat exchanger 12 via the flow switching device 14. The outdoor heat exchanger 12 exchanges heat between the outdoor air that is supplied from the outdoor fan 121 and the high-temperature and high-pressure gas refrigerant. Intermediate-temperature and high-pressure refrigerant that is acquired by cooling the refrigerant at the outdoor heat exchanger 12 flows into the expansion device 13. The expansion device 13 decompresses the intermediate-temperature and high-pressure refrigerant in a two-phase or liquid state. Low-temperature and low-pressure two-phase refrigerant that is acquired by decompressing the refrigerant at the expansion device 13 flows into the indoor heat exchanger 31a via the liquid pipe 16. At this time, the indoor unit 3a performs the cooling operation, and the indoor heat exchanger 31a exchanges heat between the indoor air that is supplied from the indoor fan 33a and the low-temperature refrigerant. Intermediate-temperature refrigerant that is acquired by heating the refrigerant at the indoor heat exchanger 31a passes through the gas pipe 15 and the flow switching device 14 and is sucked by the compressor 11.

The compressor 11 is controlled such that a temperature difference $\Delta T$ between a target indoor temperature Tm and the indoor temperature Ta detected by the indoor temperature sensor 35a approaches 0. For example, the larger the temperature difference $\Delta T$, the higher the rotation frequency of the compressor 11, and the smaller the temperature difference $\Delta T$, the lower the rotation frequency of the compressor 11. An air volume from the indoor unit 3a is controlled by the controller 50. The controller 50 controls the air volume from the indoor unit 3a within an adjustable range. For example, the upper limit of the adjustable range is 100% of the maximum possible air volume of the indoor fan 33a, and the lower limit of the adjustable range is 70% of the maximum possible air volume.

[Conditions for Change into Dehumidifying Operation Modes]

Conditions for change from the cooling operation mode into the dehumidifying operation modes will be described below. When the temperature difference $\Delta T$ described above becomes a predetermined temperature or less, and the amount of change in the rotation frequency of the compressor 11 becomes a predetermined value or less, whether a change into one of the dehumidifying operation modes is made is determined.

[Determination of Dehumidifying Operation Mode]

Figure 2:
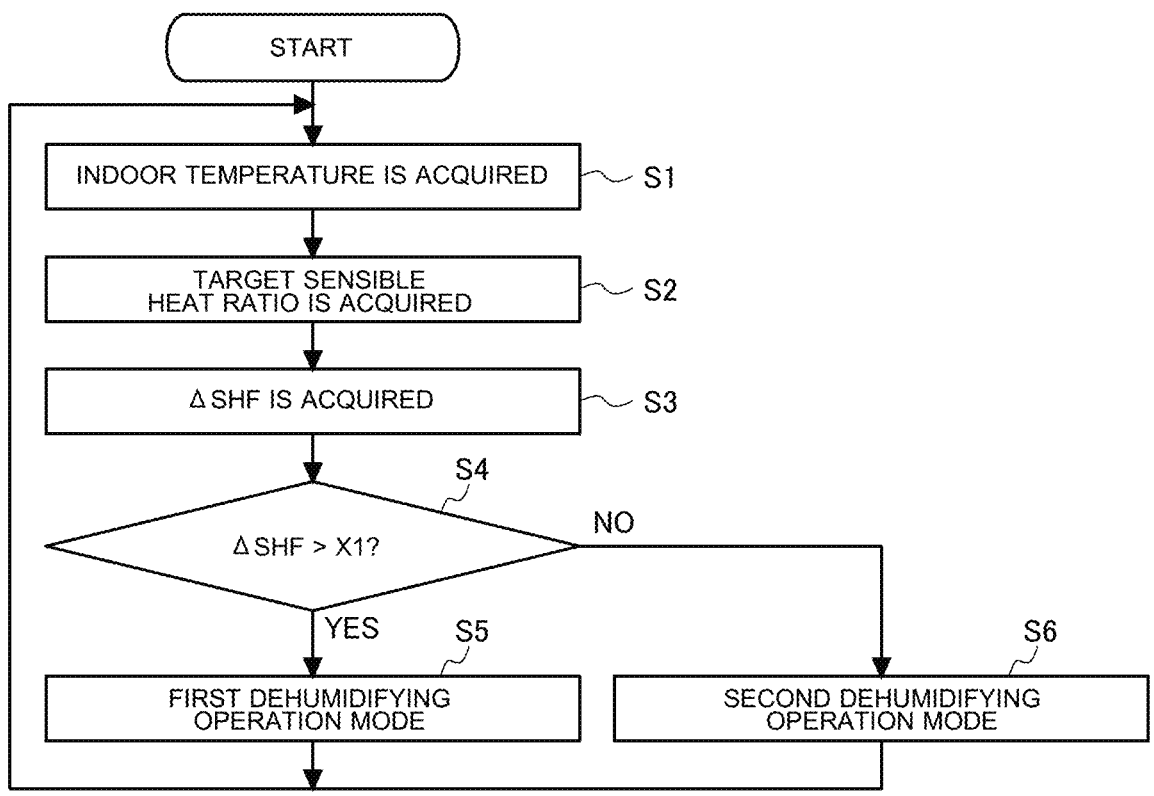
FIG. 2 is a flowchart for the air-conditioning apparatus according to Embodiment 1 when a cooling operation mode is changed into a dehumidifying operation mode.

FIG. 2 is a flowchart for the air-conditioning apparatus 100 according to Embodiment 1 when the cooling operation mode is changed into one of the dehumidifying operation modes.

The dehumidifying operation modes of the air-conditioning apparatus 100 according to Embodiment 1 include a first dehumidifying operation mode and a second dehumidifying operation mode.

The flow of change from the cooling operation mode into one of the dehumidifying operation modes of the air-conditioning apparatus 100 according to Embodiment 1 will be described below with reference to FIG. 2.

(Step S1)

The controller 50 acquires the indoor temperature Ta detected by the indoor temperature sensor 35a. Subsequently, processing proceeds to step S2.

(Step S2)

The controller 50 acquires a target sensible heat ratio SHF from the acquired indoor temperature Ta, the target indoor temperature Tm, and target indoor humidity. Subsequently, the processing proceeds to step S3.

(Step S3)

The controller 50 acquires a sensible heat ratio difference $\Delta$SHF, which is a difference between the target sensible heat ratio SHF and the theoretical minimum possible sensible heat ratio SHFm. Specifically, the sensible heat ratio difference $\Delta$SHF is acquired by subtracting the theoretical minimum possible sensible heat ratio SHFm from the target sensible heat ratio SHF. Subsequently, the processing proceeds to step S4. The theoretical minimum possible sensible heat ratio SHFm is acquired by the following expression.

$$\text{SHFm} = \Delta hs/(hi-ho) \qquad \text{[Math. 1]}$$

Here, hi is the enthalpy of the indoor air that is acquired from the indoor temperature and relative humidity, ho is the enthalpy of air (referred to below as blown air) that is blown via an air outlet of the indoor unit 3a when the relative humidity is 100%, and $\Delta$hs is the enthalpy of sensible heat. The enthalpy of the sensible heat can be calculated by $\Delta hs = (\text{Tin} - \text{Tout}) \times Cp$, where Tin is the temperature of air that is sucked via the air inlet of the indoor unit 3a, Tout is the temperature of the air that is blown via the air outlet of the indoor unit 3a, and Cp is the specific heat of air. The smaller the value of hi, the higher the theoretical minimum possible sensible heat ratio SHFm, and the larger the value of ho, the higher the theoretical minimum possible sensible heat ratio SHFm. In view of this, for example, the temperature of the blown air regarding ho may be extremely lower than the temperature of the indoor air regarding hi to decrease the theoretical minimum possible sensible heat ratio SHFm and to increase the sensible heat ratio difference $\Delta$SHF.

(Step S4)

The controller 50 determines whether the sensible heat ratio difference $\Delta$SHF is larger than a reference value X1. When the controller 50 determines that the sensible heat ratio difference $\Delta$SHF is larger than the reference value X1 (YES), the processing proceeds to step S5. On the other hand, when the controller 50 determines that the sensible heat ratio difference $\Delta$SHF is not larger than the reference value X1 (NO), the processing proceeds to step S6. The reference value X1 is, for example, 0.2 to 0.3, is determined depending on the dew point of the indoor air, and increases as the dew point of the indoor air decreases.

(Step S5)

The controller 50 changes the operation mode from the cooling operation mode into the first dehumidifying operation mode. Subsequently, the processing returns to step S1.

(Step S6)

The controller 50 changes the operation mode from the cooling operation mode into the second dehumidifying operation mode. Subsequently, the processing returns to step S1.

[First Dehumidifying Operation Mode]

Figure 3:
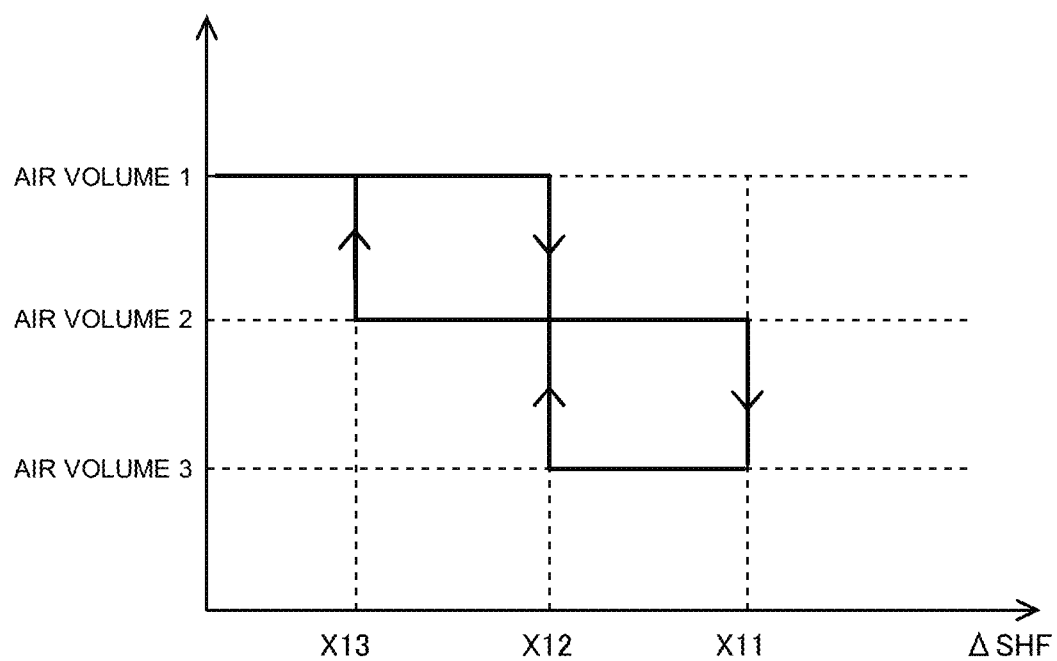
FIG. 3 is a chart illustrating an example of a control operation of the air-conditioning apparatus according to Embodiment 1 in a first dehumidifying operation mode.

FIG. 3 is a chart illustrating an example of a control operation of the air-conditioning apparatus 100 according to Embodiment 1 in the first dehumidifying operation mode. In FIG. 3, the horizontal axis represents the sensible heat ratio difference, and the vertical axis represents the air volume of the indoor fan 33a. Arrows in FIG. 3 represent transition of the air volume.

The first dehumidifying operation mode of the air-conditioning apparatus 100 according to Embodiment 1 will be described below with reference to FIG. 3.

In the first dehumidifying operation mode, the controller 50 controls the air volume of the indoor fan 33a. The lower limit of the air volume of the indoor fan 33a may be less than the lower limit of the air volume in the cooling operation mode. As illustrated in FIG. 3, the air volume of the indoor fan 33a is controlled depending on the magnitude of the sensible heat ratio difference ΔSHF. In FIG. 3, the air volume of the indoor fan 33a is controlled such that the air volume is set to one of three air volumes 1 to 3 (the air volume 1>the air volume 2>the air volume 3). However, this is not a limitation. The air volume of the indoor fan 33a may be controlled such that the air volume is set to one of three or more air volumes. The air volume of the indoor fan 33a is controlled depending on the value of the sensible heat ratio difference ΔSHF and reference values X11 to X13 (X11>X12>X13). For example, in the case where the sensible heat ratio difference ΔSHF is a small difference, the air volume of the indoor fan 33a is controlled such that the air volume is increased. In the case where the sensible heat ratio difference ΔSHF is a large difference, the air volume of the indoor fan 33a is controlled such that the air volume is decreased. In the first dehumidifying operation mode, the air volume of the indoor fan 33a is thus increased when the value of the sensible heat ratio difference ΔSHF decreases. This enables the indoor space to be dehumidified because the evaporating temperature of the refrigerant that flows through the indoor heat exchanger 31a decreases to a temperature less than or equal to the dew point of the indoor air. For example, X13=0.2 to 0.3, X12=X13+α, and X11=X12+a are satisfied. For example, α is 0.1. When α is less than 0.05, however, the air volume of the indoor fan 33a can be more finely controlled.

[Second Dehumidifying Operation Mode]

Figure 4:
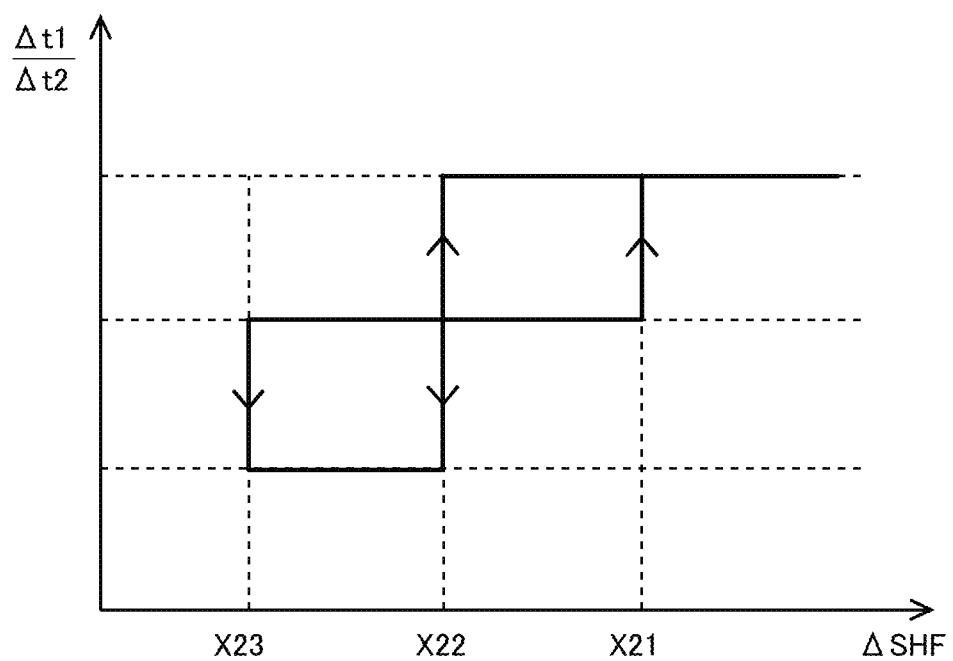
FIG. 4 is a chart illustrating an example of a control operation of the air-conditioning apparatus according to Embodiment 1 in a second dehumidifying operation mode.

FIG. 4 is a chart illustrating an example of a control operation of the air-conditioning apparatus 100 according to Embodiment 1 in the second dehumidifying operation mode. In FIG. 4, the horizontal axis represents the sensible heat ratio difference, and the vertical axis represents a ratio between an ON time and an OFF time. Arrows in FIG. 4 represent transition of the sensible heat ratio difference.

The second dehumidifying operation mode of the air-conditioning apparatus 100 according to Embodiment 1 will be described below with reference to FIG. 4.

In the second dehumidifying operation mode, an ON mode in which the rotation frequency of the compressor 11 is controlled for the ON time Δt1 alternates with an OFF mode in which the operation of the compressor 11 is suspended for the OFF time Δt2. In the ON mode, the rotation frequency of the compressor 11 is increased to a rotation frequency higher than the rotation frequency in the cooling operation mode, and cooling capacity is increased. The flow switching device 14, the outdoor fan 121, and the expansion device 13 operate in the same manner as in the cooling operation mode described above. At this time, the air volume of the indoor fan 33a is controlled by the controller 50 such that the air volume is set to the maximum possible air volume. In the OFF mode, the compressor 11 is suspended, the opening degree of the expansion device 13 is highest, and the outdoor fan 121 is suspended. At this time, the indoor fan 33a may be suspended. The ratio between the ON time Δt1 and the OFF time Δt2 is controlled depending on the value of the sensible heat ratio difference ΔSHF and reference values X21 to X23 (X21>X22>X23). For example, in the case where the sensible heat ratio difference ΔSHF is a small difference, the ratio between the ON time Δt1 and the OFF time Δt2 is controlled such that the time of the ON mode is relatively decreased. In the case where the sensible heat ratio difference ΔSHF is a large difference, the ratio between the ON time Δt1 and the OFF time Δt2 is controlled such that the time of the ON mode is relatively increased. In the second dehumidifying operation mode, the ON mode thus alternates with the OFF mode. In the ON mode, the rotation frequency of the compressor 11 is increased, and the cooling capacity is increased. This enables the amount of dehumidification to be ensured and enables the indoor space to be sufficiently dehumidified. In addition, in the OFF mode, the compressor 11 is suspended, and the indoor space can be consequently prevented from being cooled to too low temperature. For example, X23=0.1 to 0.2, X22=X23+β, and X21=X22+β are satisfied. For example, β is 0.1. When β is less than 0.05, however, the ratio between the ON time Δt1 and the OFF time Δt2 can be more finely controlled.

The air-conditioning apparatus 100 according to Embodiment 1 described above includes the indoor unit 3a, which is installed in the indoor space and includes the indoor heat exchanger 31a, the indoor fan 33a, which sends the indoor air to the indoor heat exchanger 31a, and the indoor temperature sensor 35a, which detects the indoor temperature Ta, the outdoor unit 1, which is installed outside the indoor space described above and includes the compressor 11 and the outdoor heat exchanger 12, the refrigerant circuit in which the compressor 11, the outdoor heat exchanger 12, the expansion device 13, and the indoor heat exchanger 31a are connected by the pipes, and the controller 50 having the cooling operation mode in which the indoor space is cooled and the multiple dehumidifying operation modes in which the indoor space is dehumidified. The multiple dehumidifying operation modes include the first dehumidifying operation mode in which the air volume of the indoor fan 33a is increased or decreased and the second dehumidifying operation mode in which the compressor 11 alternates between operation and suspension. When the cooling operation mode is changed into one of the dehumidifying operation modes, the controller 50 selects the one of the multiple dehumidifying operation modes on the basis of the value of the sensible heat ratio difference ΔSHF, which is a difference between the target sensible heat ratio SHF acquired from the indoor temperature Ta detected by the indoor temperature sensor 35a, the target indoor temperature Tm, and the target indoor humidity and the theoretical minimum possible sensible heat ratio SHFm acquired from the enthalpy hi of the indoor air, the enthalpy ho of the blown air from the indoor unit 3a when the relative humidity is 100%, and the enthalpy Δhs of the sensible heat.

In the air-conditioning apparatus 100 according to Embodiment 1, the controller 50 selects one of the multiple dehumidifying operation modes having different dehumidifying capacities on the basis of the value of the sensible heat ratio difference ΔSHF, which is a difference between the target sensible heat ratio SHF and the theoretical minimum possible sensible heat ratio SHFm when the cooling operation mode is changed into the one of the dehumidifying operation modes. This enables the optimal possible dehumidifying operation mode for dehumidification to be selected, prevents the evaporating temperature from greatly decreasing, and enables dehumidification to be performed without reducing user comfort.

In the air-conditioning apparatus 100 according to Embodiment 1, the controller 50 changes the cooling operation mode into the first dehumidifying operation mode in the case where the sensible heat ratio difference ΔSHF is larger than a first reference value. The controller 50 changes the cooling operation mode into the second dehumidifying operation mode in the case where the sensible heat ratio difference ΔSHF is not larger than the first reference value.

In the air-conditioning apparatus 100 according to Embodiment 1, the controller 50 makes a change into the first dehumidifying operation mode in the case where the sensible heat ratio difference ΔSHF is larger than the first reference value and makes a change into the second dehumidifying operation mode in the case where the sensible heat ratio difference ΔSHF is not larger than the first reference value. That is, when the sensible heat ratio difference ΔSHF is a large difference, and there is no possibility that the indoor space is cooled to too low temperature, the controller 50 makes the change into the first dehumidifying operation mode in which the evaporating temperature is controlled by controlling the air volume of the indoor fan 33a. When the sensible heat ratio difference ΔSHF is a small difference, and there is a possibility that the indoor space is cooled to too low temperature, the controller 50 makes the change into the second dehumidifying operation mode in which the evaporating temperature is controlled by controlling the on-off and rotation frequency of the compressor 11. This enables the optimal possible dehumidifying operation mode for dehumidification to be selected, prevents the evaporating temperature from greatly decreasing, and enables dehumidification to be performed without reducing the user comfort.

In the air-conditioning apparatus 100 according to Embodiment 1, the controller 50 determines the air volume of the indoor fan 33a on the basis of the value of the sensible heat ratio difference ΔSHF in the first dehumidifying operation mode. The controller 50 then decreases the air volume of the indoor fan 33a when the value of the sensible heat ratio difference ΔSHF decreases.

In the air-conditioning apparatus 100 according to Embodiment 1, the air volume of the indoor fan 33a is decreased when the value of the sensible heat ratio difference ΔSHF decreases. Consequently, the evaporating temperature of the refrigerant that flows through the indoor heat exchanger 31a decreases to a temperature less than or equal to the dew point of the indoor air, and the indoor space can be dehumidified.

In the air-conditioning apparatus 100 according to Embodiment 1, in the second dehumidifying operation mode, the controller 50 alternates between the ON mode and the OFF mode, the rotation frequency of the compressor 11 is controlled for the ON time Δt1 such that the indoor temperature Ta detected by the indoor temperature sensor 35a approaches the target indoor temperature Tm in the ON mode, and the operation of the compressor 11 is suspended for the OFF time Δt2 in the OFF mode. The controller 50 then determines the ratio between the ON time Δt1 and the OFF time Δt2 on the basis of the value of the sensible heat ratio difference ΔSHF.

The air-conditioning apparatus 100 according to Embodiment 1 alternates between the ON mode and the OFF mode and can consequently prevent the indoor space from being cooled to too low temperature while sufficiently dehumidifying the indoor space.

Embodiment 2

Embodiment 2 will be described below, where a description for a content common to Embodiment 1 is omitted, and components that are the same as or correspond to the components in Embodiment 1 are designated by the same reference signs.

[Air-Conditioning Apparatus]

Figure 5:
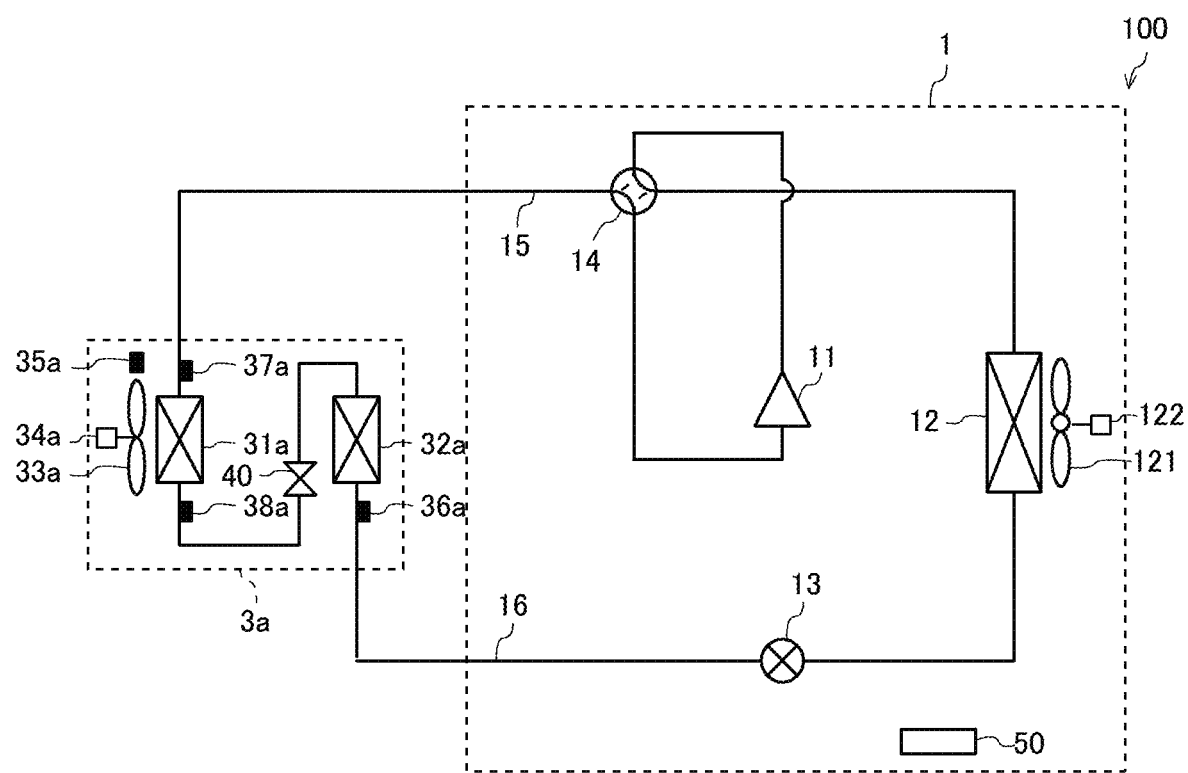
FIG. 5 is a refrigerant circuit diagram illustrating an example of the structure of an air-conditioning apparatus according to Embodiment 2.

FIG. 5 is a refrigerant circuit diagram illustrating an example of the structure of an air-conditioning apparatus 100 according to Embodiment 2.

As illustrated in FIG. 5, the air-conditioning apparatus 100 according to Embodiment 2 includes the outdoor unit 1 and the indoor unit 3a. The outdoor unit 1 and the indoor unit 3a are connected to each other by the gas pipe 15 and the liquid pipe 16 and are included in the refrigerant circuit.

[Indoor Unit]

The indoor unit 3a is installed, for example, inside a room and supplies air for air conditioning to an indoor space. The indoor unit 3a includes the indoor heat exchanger 31a, an auxiliary heat exchanger 32a, and an indoor expansion device 40. The indoor heat exchanger 31a and the auxiliary heat exchanger 32a are connected to each other by a pipe and across the indoor expansion device 40. The indoor unit 3a also includes the indoor fan 33a, which sends air to the indoor heat exchanger 31a and the auxiliary heat exchanger 32a.

The indoor heat exchanger 31a and the auxiliary heat exchanger 32a exchange heat between the air and refrigerant, consequently condenses or evaporates the refrigerant, and generates heating air or cooling air to be supplied to the indoor space. The indoor fan 33a sends indoor air to the indoor heat exchanger 31a and the auxiliary heat exchanger 32a. The indoor fan 33a is driven by the indoor fan motor 34a. The indoor fan 33a is disposed at an air passage upstream of the indoor heat exchanger 31a and the auxiliary heat exchanger 32a but is not limited to such a location. The indoor fan 33a may be disposed at the air passage downstream of the indoor heat exchanger 31a and the auxiliary heat exchanger 32a. The indoor expansion device 40 decompresses and expands the refrigerant and is, for example, an on-off valve that opens to a fixed opening degree or closes.

The indoor unit 3a also includes the indoor temperature sensor 35a, the entrance temperature sensor 36a, the exit temperature sensor 37a, and an intermediate temperature sensor 38a. The indoor temperature sensor 35a is, for example, a thermistor and detects the indoor temperature Ta. The indoor temperature sensor 35a is disposed at an air inlet of the indoor unit 3a for the indoor air during a cooling operation. The entrance temperature sensor 36a is, for example, a thermistor and detects the temperature of the refrigerant that flows into the auxiliary heat exchanger 32a during the cooling operation. The entrance temperature sensor 36a is disposed at the pipe at the entrance of the auxiliary heat exchanger 32a for the refrigerant during the cooling operation. The exit temperature sensor 37a is, for example, a thermistor and detects the temperature of the refrigerant that flows out from the indoor heat exchanger 31a during the cooling operation. The exit temperature sensor 37a is disposed at the exit of the indoor heat exchanger 31a for the refrigerant during the cooling operation. The intermediate temperature sensor 38a is, for example, a thermistor and detects the temperature of the refrigerant that flows into the indoor heat exchanger 31a during the cooling operation. The intermediate temperature sensor 38a is disposed at the pipe between the indoor expansion device 40 and the indoor heat exchanger 31a.

The structure of the outdoor unit 1 according to Embodiment 2 is the same as the structure according to Embodiment 1 and is thus not described.

The refrigerant circuit of the air-conditioning apparatus 100 according to Embodiment 2 is formed by connecting the compressor 11, the flow switching device 14, the outdoor heat exchanger 12, the expansion device 13, the auxiliary heat exchanger 32a, the indoor expansion device 40, and the indoor heat exchanger 31a in this order by the pipes.

[Cooling Operation Mode]

The cooling operation mode in which the indoor heat exchanger 31a of the air-conditioning apparatus 100 according to Embodiment 2 generates a cooling load will be described.

The flow of the refrigerant will first be described. The compressor 11 sucks and compresses low-temperature and low-pressure gas refrigerant and discharges high-temperature and high-pressure gas refrigerant. The high-temperature and high-pressure gas refrigerant that is discharged from the compressor 11 flows into the outdoor heat exchanger 12 via the flow switching device 14. The outdoor heat exchanger 12 exchanges heat between the outdoor air that is supplied from the outdoor fan 121 and the high-temperature and high-pressure gas refrigerant. Intermediate-temperature and high-pressure refrigerant that is acquired by cooling the refrigerant at the outdoor heat exchanger 12 flows into the expansion device 13. The expansion device 13 decompresses the intermediate-temperature and high-pressure refrigerant in a two-phase or liquid state. Low-temperature and low-pressure two-phase refrigerant that is acquired by decompressing the refrigerant at the expansion device 13 flows into the auxiliary heat exchanger 32a via the liquid pipe 16. At this time, the indoor unit 3a performs the cooling operation, and the auxiliary heat exchanger 32a exchanges heat between the indoor air that is supplied from the indoor fan 33a and the low-temperature refrigerant. The refrigerant that is heated by the auxiliary heat exchanger 32a flows into the indoor heat exchanger 31a via the indoor expansion device 40, which fully opens. At this time, the indoor unit 3a performs the cooling operation, and the indoor heat exchanger 31a exchanges heat between the indoor air that is supplied from the indoor fan 33a and the refrigerant. Intermediate-temperature refrigerant that is acquired by heating the refrigerant at the indoor heat exchanger 31a passes through the gas pipe 15 and the flow switching device 14 and is sucked by the compressor 11.

The compressor 11 is controlled such that the temperature difference $\Delta T$ between the target indoor temperature Tm and the indoor temperature Ta detected by the indoor temperature sensor 35a approaches 0. For example, the larger the temperature difference $\Delta T$, the higher the rotation frequency of the compressor 11, and the smaller the temperature difference $\Delta T$, the lower the rotation frequency of the compressor 11. An air volume from the indoor unit 3a is controlled by the controller 50. The controller 50 controls the air volume from the indoor unit 3a within an adjustable range. For example, the upper limit of the adjustable range is 100% of the maximum possible air volume of the indoor fan 33a, and the lower limit of the adjustable range is 70% of the maximum possible air volume.

[Determination of Dehumidifying Operation Mode]

Figure 6:
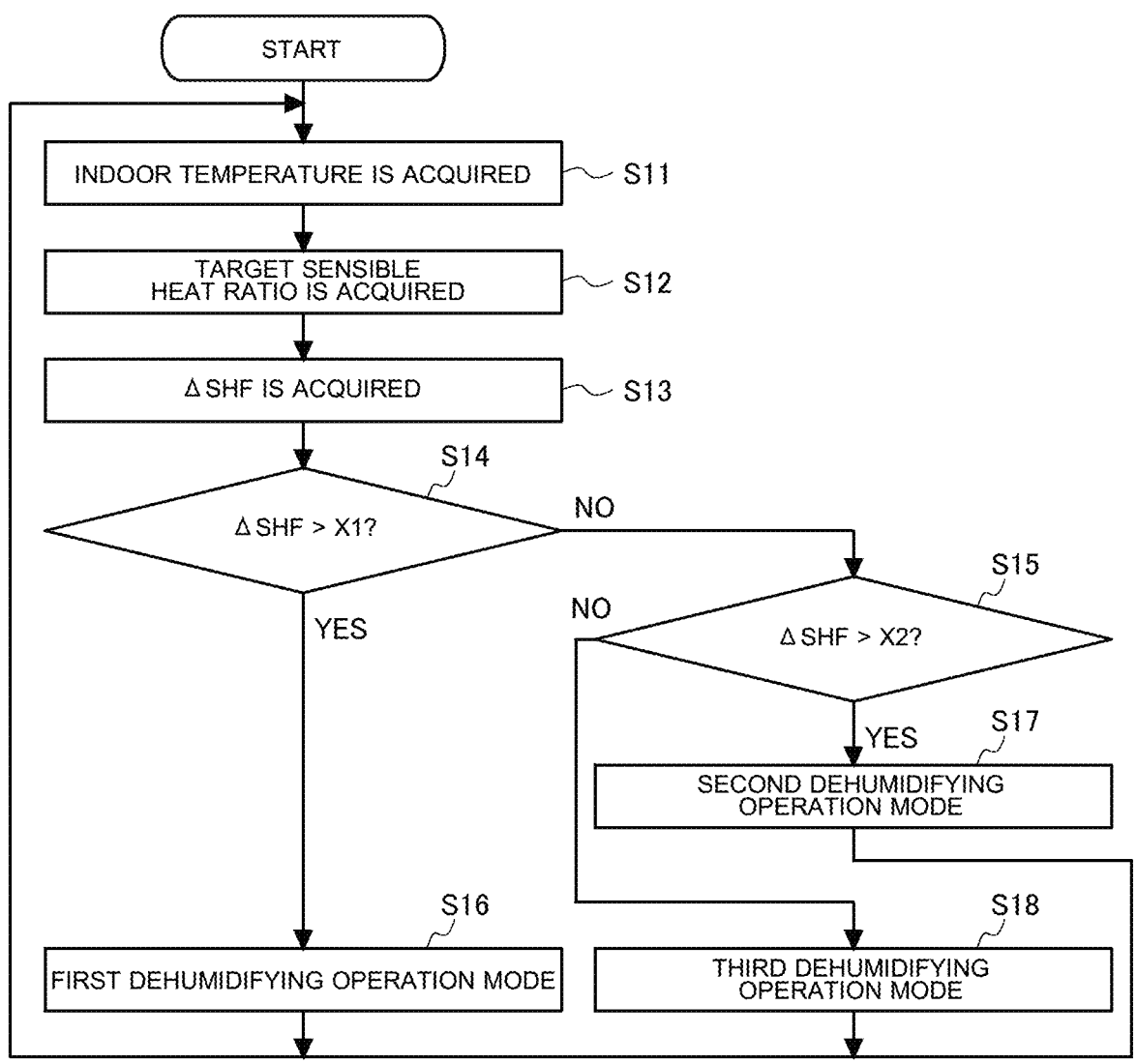
FIG. 6 is a flowchart for the air-conditioning apparatus according to Embodiment 2 when the cooling operation mode is changed into a dehumidifying operation mode.

FIG. 6 is a flowchart for the air-conditioning apparatus 100 according to Embodiment 2 when the cooling operation mode is changed into one of dehumidifying operation modes.

The dehumidifying operation modes of the air-conditioning apparatus 100 according to Embodiment 2 include the first dehumidifying operation mode, the second dehumidifying operation mode, and a third dehumidifying operation mode.

The flow of change from the cooling operation mode into one of the dehumidifying operation modes of the air-conditioning apparatus 100 according to Embodiment 2 will be described below with reference to FIG. 6.

(Step S11)

The controller 50 acquires the indoor temperature Ta detected by the indoor temperature sensor 35a. Subsequently, processing proceeds to step S12.

(Step S12)

The controller 50 acquires the target sensible heat ratio SHF from the acquired indoor temperature Ta, the target indoor temperature Tm, and the target indoor humidity. Subsequently, the processing proceeds to step S13.

(Step S13)

The controller 50 acquires the sensible heat ratio difference $\Delta SHF$, which is a difference between the theoretical minimum possible sensible heat ratio SHFm and the target sensible heat ratio SHF. Subsequently, the processing proceeds to step S14.

The theoretical minimum possible sensible heat ratio SHFm is acquired by the expression described in Embodiment 1.

(Step S14)

The controller 50 determines whether the sensible heat ratio difference $\Delta SHF$ is larger than the reference value X1. When the controller 50 determines that the sensible heat ratio difference $\Delta SHF$ is larger than the reference value X1 (YES), the processing proceeds to step S16. On the other hand, when the controller 50 determines that the sensible heat ratio difference $\Delta SHF$ is not larger than the reference value X1 (NO), the processing proceeds to step S15.

(Step S15)

The controller 50 determines whether the sensible heat ratio difference $\Delta SHF$ is larger than a reference value X2 (<X1). When the controller 50 determines that the sensible heat ratio difference $\Delta SHF$ is larger than the reference value X2 (YES), the processing proceeds to step S17. On the other hand, when the controller 50 determines that the sensible heat ratio difference $\Delta SHF$ is not larger than the reference value X2 (NO), the processing proceeds to step S18. The reference value X2 is, for example, 0.1 to 0.2, is determined depending on the dew point of the indoor air, and increases as the dew point of the indoor air decreases.

(Step S16)

The controller 50 changes the operation mode from the cooling operation mode into the first dehumidifying operation mode. Subsequently, the processing returns to step S11.

(Step S17)

The controller 50 changes the operation mode from the cooling operation mode into the second dehumidifying operation mode. Subsequently, the processing returns to step S11.

(Step S18)

The controller 50 changes the operation mode from the cooling operation mode into the third dehumidifying operation mode. Subsequently, the processing returns to step S11.

[Third Dehumidifying Operation Mode]

The third dehumidifying operation mode of the air-conditioning apparatus 100 according to Embodiment 2 will be described below. The first dehumidifying operation mode and the second dehumidifying operation mode of the air-conditioning apparatus 100 according to Embodiment 2 are the same as those according to Embodiment 1 and are not described.

The compressor 11 sucks and compresses low-temperature and low-pressure gas refrigerant and discharges high-temperature and high-pressure gas refrigerant. The high-temperature and high-pressure gas refrigerant that is discharged from the compressor 11 flows into the outdoor heat exchanger 12 via the flow switching device 14. The outdoor heat exchanger 12 exchanges heat between the outdoor air that is supplied from the outdoor fan 121 and the high-temperature and high-pressure gas refrigerant. Intermediate-temperature and high-pressure refrigerant that is acquired by cooling the refrigerant at the outdoor heat exchanger 12 flows into the auxiliary heat exchanger 32a via the expansion device 13. At this time, the opening degree of the expansion device 13 is highest. The auxiliary heat exchanger 32a exchanges heat between the indoor air that is supplied from the indoor fan 33a and the high-temperature and high-pressure refrigerant. The indoor expansion device 40 decompresses intermediate-temperature refrigerant that is acquired by cooling the refrigerant at the auxiliary heat exchanger 32a into low-temperature and low-pressure refrigerant, and the low-temperature and low-pressure refrigerant flows into the indoor heat exchanger 31a. At this time, the indoor heat exchanger 31a exchanges heat between the indoor air that is supplied from the indoor fan 33a and the low-temperature and low-pressure refrigerant. Intermediate-temperature and low-pressure refrigerant that is acquired by heating the refrigerant at the indoor heat exchanger 31a passes through the gas pipe 15 and the flow switching device 14 and is sucked by the compressor 11. The indoor expansion device 40 is opened or closed on the basis of the indoor temperature Ta detected by the indoor temperature sensor 35a.

Figure 7:
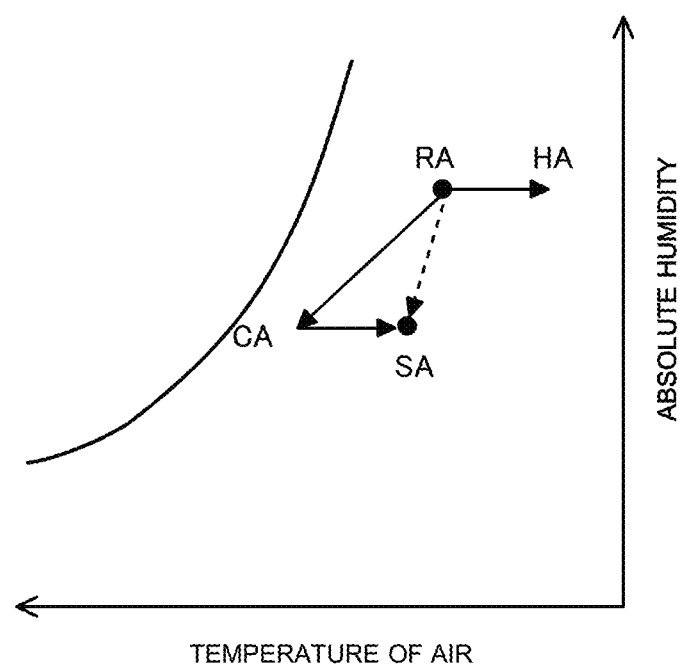
FIG. 7 is a saturated air psychrometric chart illustrating an example of the state of air in the air-conditioning apparatus according to Embodiment 2 in a third dehumidifying operation mode.

FIG. 7 is a saturated air psychrometric chart illustrating an example of the state of air in the air-conditioning apparatus 100 according to Embodiment 2 in the third dehumidifying operation mode. In FIG. 7, the horizontal axis represents the temperature of the air, the vertical axis represents absolute humidity, and a curve represents a saturated air curve.

In the third dehumidifying operation mode, as illustrated in FIG. 7, the indoor air (RA in the figure) that is supplied from the indoor fan 33a is cooled by the indoor heat exchanger 31a (CA in the figure) and is heated by the auxiliary heat exchanger 32a (HA in the figure). Low-temperature and low-humidity air that is acquired by cooling the indoor air by use of the indoor heat exchanger 31a and high-temperature and intermediate-humidity air that is acquired by heating the indoor air by use of the auxiliary heat exchanger 32a are mixed in the indoor unit 3a, and the mixed air is subsequently supplied to the indoor space (SA in the figure). This enables intermediate-temperature and low-humidity air to be supplied from the indoor unit 3a to the indoor space. That is, a reheat dehumidifying operation can be performed in the dehumidifying operation mode.

In the air-conditioning apparatus 100 according to Embodiment 2 described above, the indoor unit 3a includes the auxiliary heat exchanger 32a disposed between the indoor heat exchanger 31a and the expansion device 13 and the indoor expansion device 40 disposed between the indoor heat exchanger 31a and the auxiliary heat exchanger 32a. In addition, the dehumidifying operation modes include the third dehumidifying operation mode in which the indoor expansion device 40 is opened or closed on the basis of the indoor temperature Ta detected by the indoor temperature sensor 35a.

The dehumidifying operation modes of the air-conditioning apparatus 100 according to Embodiment 2 include the third dehumidifying operation mode in which the indoor expansion device 40 is opened or closed on the basis of the indoor temperature Ta detected by the indoor temperature sensor 35a. In the third dehumidifying operation mode, the low-temperature and low-humidity air that is acquired by cooling the indoor air by use of the indoor heat exchanger 31a and the high-temperature and intermediate-humidity air that is acquired by heating the indoor air by use of the auxiliary heat exchanger 32a are mixed in the indoor unit 3a, and the mixed air is subsequently supplied to the indoor space. For this reason, the intermediate-temperature and low-humidity air can be supplied from the indoor unit 3a to the indoor space.

In the air-conditioning apparatus 100 according to Embodiment 2, the controller 50 changes the cooling operation mode into the first dehumidifying operation mode in the case where the sensible heat ratio difference ΔSHF is larger than the first reference value. The controller 50 changes the cooling operation mode into the second dehumidifying operation mode in the case where the sensible heat ratio difference ΔSHF is not larger than the first reference value and is larger than the second reference value, which is a value smaller than the first reference value. The controller 50 changes the cooling operation mode into the third dehumidifying operation mode in the case where the sensible heat ratio difference ΔSHF is not larger than the second reference value.

In the air-conditioning apparatus 100 according to Embodiment 2, the controller 50 makes a change into the first dehumidifying operation mode in the case where the sensible heat ratio difference ΔSHF is larger than the first reference value. The controller 50 makes a change into the second dehumidifying operation mode in the case where the sensible heat ratio difference ΔSHF is not larger than the first reference value and is larger than the second reference value and makes a change into the third dehumidifying operation mode in the case where the sensible heat ratio difference ΔSHF is not larger than the second reference value. That is, when the sensible heat ratio difference ΔSHF is a large difference, and there is no possibility that the indoor space is cooled to too low temperature, the controller 50 makes the change into the first dehumidifying operation mode in which the evaporating temperature is controlled by controlling the air volume of the indoor fan 33a. When the sensible heat ratio difference ΔSHF is a small difference, and there is a possibility that the indoor space is cooled to too low temperature, the controller 50 makes the change into the second dehumidifying operation mode in which the evaporating temperature is controlled by controlling the on-off and rotation frequency of the compressor 11. When the sensible heat ratio difference ΔSHF is smaller than the small difference, and there is a possibility that the indoor space is cooled to a temperature lower than the too low temperature, the controller 50 makes the change into the third dehumidifying operation mode in which the intermediate-temperature and low-humidity air is supplied from the indoor unit 3a to the indoor space. This enables the optimal possible dehumidifying operation mode for dehumidification to be selected, prevents the evaporating temperature from greatly decreasing, and enables dehumidification to be performed without reducing the user comfort.

Embodiment 3

Embodiment 3 will be described below, where a description for a content common to Embodiment 1 and Embodiment 2 is omitted, and components that are the same as or correspond to the components in Embodiment 1 and Embodiment 2 are designated by the same reference signs.
[Air-Conditioning Apparatus]

Figure 8:
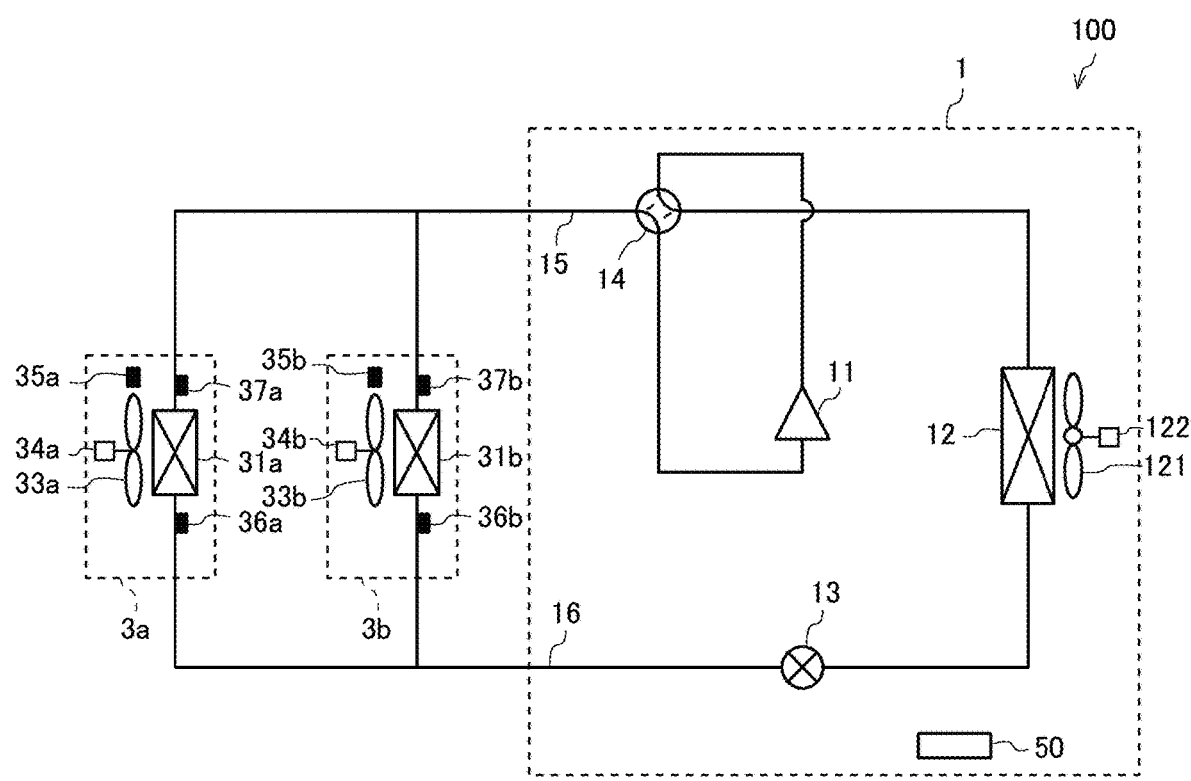
FIG. 8 is a refrigerant circuit diagram illustrating an example of the structure of an air-conditioning apparatus according to Embodiment 3.

FIG. 8 is a refrigerant circuit diagram illustrating an example of the structure of an air-conditioning apparatus 100 according to Embodiment 3.

As illustrated in FIG. 8, the air-conditioning apparatus 100 according to Embodiment 3 includes the outdoor unit 1 and indoor units 3a and 3b. The outdoor unit 1 and the indoor units 3a and 3b are connected to each other by the gas pipe 15 and the liquid pipe 16 and are included in the refrigerant circuit. In an example illustrated in FIG. 8, the two indoor units 3a and 3b are connected to the outdoor unit 1. However, this is not a limitation, and the number of the indoor units may be three or more.

[Indoor Unit]

The indoor units 3a and 3b are installed, for example, inside a room and supply air for air conditioning to an indoor space. The indoor unit 3a includes the indoor heat exchanger 31a, and the indoor unit 3b includes an indoor heat exchanger 31b. The indoor units 3a and 3b are connected to the outdoor unit 1 such that the indoor units 3a and 3b are in parallel with each other. The indoor unit 3a also includes the indoor fan 33a, which sends air to the indoor heat exchanger 31a, and the indoor unit 3b also includes an indoor fan 33b, which sends air to the indoor heat exchanger 31b. The indoor fan 33a is driven by the indoor fan motor 34a, and the indoor fan 33b is driven by an indoor fan motor 34b.

The indoor unit 3a also includes the indoor temperature sensor 35a, the entrance temperature sensor 36a, and the exit temperature sensor 37a, and the indoor unit 3b also includes an indoor temperature sensor 35b, an entrance temperature sensor 36b, and an exit temperature sensor 37b. The indoor temperature sensor 35a is, for example, a thermistor and detects the indoor temperature Ta, and the indoor temperature sensor 35b is, for example, a thermistor and detects an indoor temperature Tb. The indoor temperature sensor 35a is disposed at an air inlet of the indoor unit 3a for indoor air, and the indoor temperature sensor 35b is disposed at an air inlet of the indoor unit 3b for the indoor air. The entrance temperature sensor 36a is, for example, a thermistor and detects the temperature of refrigerant that flows into the indoor heat exchanger 31a during a cooling operation, and the entrance temperature sensor 36b is, for example, a thermistor and detects the temperature of refrigerant that flows into the indoor heat exchanger 31b during the cooling operation. The entrance temperature sensor 36a is disposed at a pipe at the entrance of the indoor heat exchanger 31a for the refrigerant during the cooling operation, and the entrance temperature sensor 36b is disposed at a pipe at the entrance of the indoor heat exchanger 31b for the refrigerant during the cooling operation. The exit temperature sensor 37a is, for example, a thermistor and detects the temperature of the refrigerant that flows out from the indoor heat exchanger 31a during the cooling operation, and the exit temperature sensor 37b is, for example, a thermistor and detects the temperature of the refrigerant that flows out from the indoor heat exchanger 31b during the cooling operation. The exit temperature sensor 37a is disposed at the exit of the indoor heat exchanger 31a for the refrigerant during the cooling operation, and the exit temperature sensor 37b is disposed at the exit of the indoor heat exchanger 31b for the refrigerant during the cooling operation.

The refrigerant circuit of the air-conditioning apparatus 100 according to Embodiment 3 is formed by connecting the compressor 11, the flow switching device 14, the outdoor heat exchanger 12, the expansion device 13, and the indoor heat exchangers 31a and 31b in this order by the pipes.

The structure of the outdoor unit 1 according to Embodiment 3 is the same as the structure according to Embodiment 1 and is thus not described.

[Cooling Operation Mode]

The cooling operation mode of the air-conditioning apparatus 100 according to Embodiment 3 in which the indoor heat exchangers 31a and 31b generate a cooling load will be described.

The flow of the refrigerant will first be described. The compressor 11 sucks and compresses low-temperature and low-pressure gas refrigerant and discharges high-temperature and high-pressure gas refrigerant. The high-temperature and high-pressure gas refrigerant that is discharged from the compressor 11 flows into the outdoor heat exchanger 12 via the flow switching device 14. The outdoor heat exchanger 12 exchanges heat between the outdoor air that is supplied from the outdoor fan 121 and the high-temperature and high-pressure gas refrigerant. Intermediate-temperature and high-pressure refrigerant that is acquired by cooling the refrigerant at the outdoor heat exchanger 12 flows into the expansion device 13. The expansion device 13 decompresses the intermediate-temperature and high-pressure refrigerant in a two-phase or liquid state. Low-temperature and low-pressure two-phase refrigerant that is acquired by decompressing the refrigerant at the expansion device 13 flows into the indoor heat exchangers 31a and 31b via the liquid pipe 16. At this time, the indoor units 3a and 3b each perform the cooling operation, the indoor heat exchanger 31a exchanges heat between the indoor air that is supplied from the indoor fan 33a and the low-temperature refrigerant, and the indoor heat exchanger 31b exchanges heat between the indoor air that is supplied from the indoor fan 33b and the low-temperature refrigerant. Intermediate-temperature refrigerant that is acquired by heating the refrigerant at the indoor heat exchangers 31a and 31b joins with each other in the gas pipe 15, passes through the gas pipe 15 and the flow switching device 14, and is sucked by the compressor 11.

The compressor 11 is controlled such that an average temperature difference ΔTave acquired by averaging a temperature difference ΔT1 between the target indoor temperature Tm and the indoor temperature Ta detected by the indoor temperature sensor 35a and a temperature difference ΔT2 between the target indoor temperature Tm and the indoor temperature Tb detected by the indoor temperature sensor 35b approaches 0. For example, the larger the average temperature difference ΔTave, the higher the rotation frequency of the compressor 11, and the smaller the average temperature difference ΔTave, the lower the rotation frequency of the compressor 11. Air volumes from the indoor units 3a and 3b are controlled by the controller 50. The controller 50 controls the air volumes from the indoor units 3a and 3b within adjustable ranges. For example, the upper limits of the adjustable ranges are 100% of the respective maximum possible air volumes of the indoor fans 33a and 33b, and the lower limits of the adjustable ranges are 70% of the respective maximum possible air volumes.

[Conditions for Change into Dehumidifying Operation Modes]

Conditions for change from the cooling operation mode into dehumidifying operation modes will be described below. When the average temperature difference ΔTave described above becomes a predetermined temperature or less, and the amount of change in the rotation frequency of the compressor 11 becomes a predetermined value or less, whether a change into one of the dehumidifying operation modes is made is determined.

[Determination of Dehumidifying Operation Mode]

Figure 9:
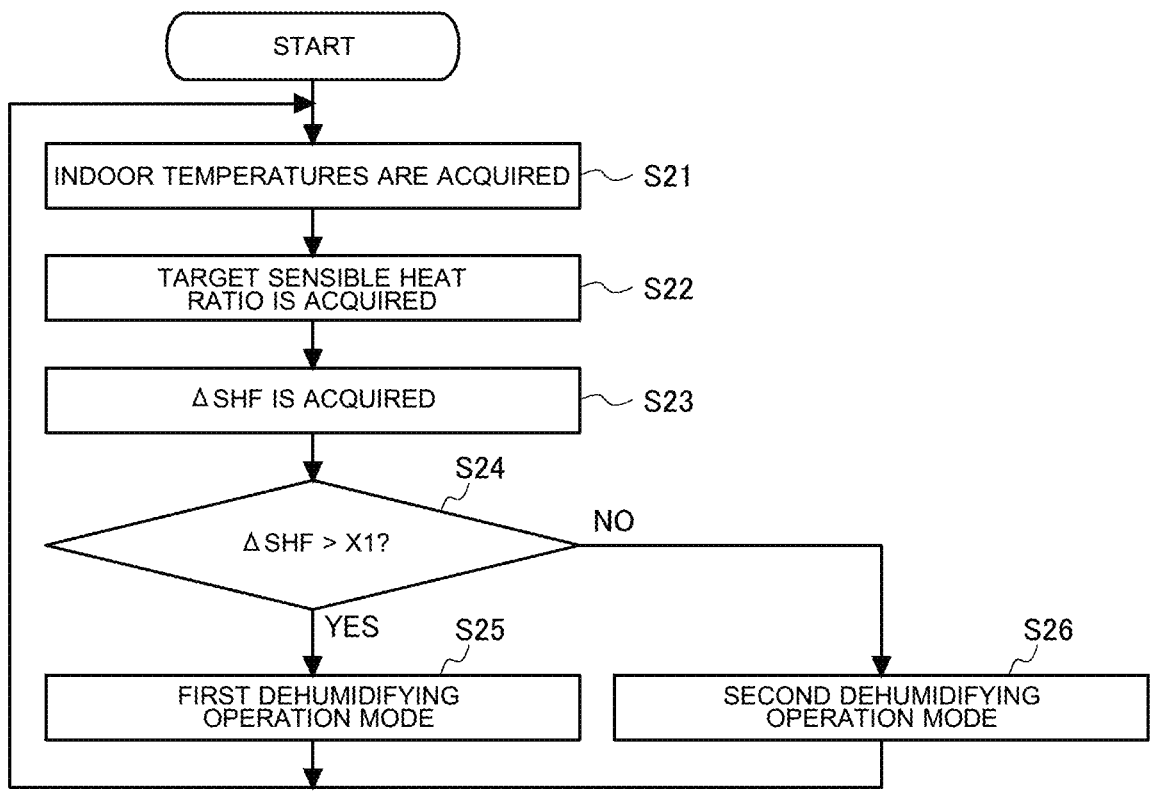
FIG. 9 is a flowchart for the air-conditioning apparatus according to Embodiment 3 when the cooling operation mode is changed into a dehumidifying operation mode.

FIG. 9 is a flowchart for the air-conditioning apparatus 100 according to Embodiment 3 when the cooling operation mode is changed into one of the dehumidifying operation modes.

The dehumidifying operation modes of the air-conditioning apparatus 100 according to Embodiment 3 include the first dehumidifying operation mode and the second dehumidifying operation mode.

The flow of change from the cooling operation mode into one of the dehumidifying operation modes of the air-conditioning apparatus 100 according to Embodiment 3 will be described below with reference to FIG. 9.

(Step S21)

The controller 50 acquires the indoor temperature Ta detected by the indoor temperature sensor 35a and the indoor temperature Tb detected by the indoor temperature sensor 35b. Subsequently, processing proceeds to step S22.

(Step S22)

The controller 50 acquires the target sensible heat ratio SHF from an average indoor temperature Tave acquired by averaging the indoor temperature Ta detected by the indoor temperature sensor 35a and the indoor temperature Tb detected by the indoor temperature sensor 35b, the target indoor temperature Tm, and the target indoor humidity. Subsequently, the processing proceeds to step S23.

(Step S23)

The controller 50 acquires the sensible heat ratio difference ΔSHF, which is a difference between the theoretical minimum possible sensible heat ratio SHFm and the target sensible heat ratio SHF. Subsequently, the processing proceeds to step S24. The theoretical minimum possible sensible heat ratio SHFm is acquired by the expression described in Embodiment 1.

(Step S24)

The controller 50 determines whether the sensible heat ratio difference ΔSHF is larger than the reference value X1. When the controller 50 determines that the sensible heat ratio difference ΔSHF is larger than the reference value X1 (YES), the processing proceeds to step S25. On the other hand, when the controller 50 determines that the sensible heat ratio difference ΔSHF is not larger than the reference value X1 (NO), the processing proceeds to step S26.

(Step S25)

The controller 50 changes the operation mode from the cooling operation mode into the first dehumidifying operation mode. Subsequently, the processing returns to step S21.

(Step S26)

The controller 50 changes the operation mode from the cooling operation mode into the second dehumidifying operation mode. Subsequently, the processing returns to step S21.

For the processing described above by way of example, the multiple indoor units 3a and 3b are installed in the same indoor space, and the target indoor temperature and the target indoor humidity are shared. Even in the case where the indoor units 3a and 3b are installed in different indoor spaces, and the indoor spaces have different target indoor temperatures and different values of the target indoor humidity, the processing described above can be used, for example, provided that the average value of the target indoor temperatures of the indoor spaces is used as the target indoor temperatures, and the average value of the values of the target indoor humidity of the indoor spaces is used as the values of the target indoor humidity.

[First Dehumidifying Operation Mode]

The first dehumidifying operation mode of the air-conditioning apparatus 100 according to Embodiment 3 will be described below with reference to FIG. 3.

In the first dehumidifying operation mode, the controller 50 controls the air volumes of the indoor fans 33a and 33b. The lower limits of the air volumes of the indoor fans 33a and 33b may be smaller than the respective lower limits in the cooling operation mode. As illustrated in FIG. 3, the air volumes of the indoor fans 33a and 33b are each controlled depending on the magnitude of the sensible heat ratio difference ΔSHF. In FIG. 3, the air volumes of the indoor fans 33a and 33b are each controlled such that the air volume is set to one of the three air volumes 1 to 3 (the air volume 1>the air volume 2>the air volume 3). However, this is not a limitation. The air volumes of the indoor fans 33a and 33b may be each controlled such that the air volume is set to one of three or more air volumes. The air volumes of the indoor fans 33a and 33b are each controlled depending on the value of the sensible heat ratio difference ΔSHF and the reference values X11 to X13. For example, in the case where the sensible heat ratio difference ΔSHF is a small difference, the air volumes of the indoor fans 33a and 33b are each controlled such that the air volume is decreased. In the case where the sensible heat ratio difference ΔSHF is a large difference, the air volumes of the indoor fans 33a and 33b are each controlled such that the air volume is increased. In the first dehumidifying operation mode, the air volumes of the indoor fans 33a and 33b are thus each decreased when the value of the sensible heat ratio difference ΔSHF decreases. This enables the indoor space to be dehumidified because the evaporating temperature of the refrigerant that flows through the indoor heat exchangers 31a and 31b decreases to a temperature less than or equal to the dew point of the indoor air.

[Second Dehumidifying Operation Mode]

The second dehumidifying operation mode of the air-conditioning apparatus 100 according to Embodiment 3 will be described below with reference to FIG. 4.

In the second dehumidifying operation mode, the ON mode in which the rotation frequency of the compressor 11 is controlled for the ON time Δt1 alternates with the OFF mode in which the operation of the compressor 11 is suspended for the OFF time Δt2. In the ON mode, the rotation frequency of the compressor 11 is increased to a rotation frequency higher than the rotation frequency in the cooling operation mode, and the cooling capacity is increased. The flow switching device 14, the outdoor fan 121, and the expansion device 13 operate in the same manner as in the cooling operation mode described above. At this time, the air volumes of the indoor fans 33a and 33b are each controlled by the controller 50 such that the air volume is set to the maximum possible air volume. In the OFF mode, the compressor 11 is suspended, the opening degree of the expansion device 13 is highest, and the outdoor fan 121 is suspended. At this time, the indoor fans 33a and 33b may be suspended. The ratio between the ON time Δt1 and the OFF time Δt2 is controlled depending on the value of the sensible heat ratio difference ΔSHF and the reference values X21 to X23. For example, in the case where the sensible heat ratio difference ΔSHF is a small difference, the ratio between the ON time Δt1 and the OFF time Δt2 is controlled such that the time of the ON mode is relatively increased. In the case where the sensible heat ratio difference ΔSHF is a large difference, the ratio between the ON time Δt1 and the OFF time Δt2 is controlled such that the time of the ON mode is relatively decreased. The ON mode thus alternates with the OFF mode. In the ON mode, the rotation frequency of the compressor 11 is increased, and the cooling capacity is increased. This enables the amount of dehumidification to be ensured and enables the indoor space to be sufficiently dehumidified. In addition, in the OFF mode, the compressor 11 is suspended, and the indoor space can be consequently prevented from being cooled to too low temperature.

At step S22 in FIG. 9, the controller 50 may acquire the target sensible heat ratio SHF from the highest indoor temperature Tmax among the indoor temperatures Ta and Tb detected by the respective indoor temperature sensors 35a and 35b, the target indoor temperature Tm, and the target indoor humidity. This enables target dehumidifying capacity to be increased and enables the indoor air to be sufficiently dehumidified in the case where the temperature of the air in the indoor space in which the indoor units 3a and 3b are installed is not uniform.

At step S22 in FIG. 9, the controller 50 may acquire the target sensible heat ratio SHF from the highest indoor temperature Tmax, the target indoor temperature Tm, and the target indoor humidity only when a difference between the highest indoor temperature Tmax and the lowest indoor temperature Tm in among the indoor temperatures Ta and Tb detected by the respective indoor temperature sensors 35a and 35b is more than or equal to a predetermined value, for example, 5 degrees. In the case where the temperature difference between the highest indoor temperature Tmax and the lowest indoor temperature Tm in is less than a predetermined value, for example, 5 degrees, the target sensible heat ratio SHF is acquired through a method described for step S22 in FIG. 9. This enables dehumidifying capacity to be increased only when the temperature of the air in the indoor space in which the indoor units 3a and 3b are installed is not uniform to a certain extent and prevents the indoor temperature from being too low temperature.

The air-conditioning apparatus 100 according to Embodiment 3, which includes the multiple indoor units 3a and 3b, has the same effects as in Embodiment 1, as described above.

The air-conditioning apparatus 100 according to Embodiment 3 described above includes the multiple indoor units 3a and 3b, and the indoor units 3a and 3b are connected to the outdoor unit 1 by the pipes such that the indoor units 3a and 3b are in parallel with each other. The controller 50 then acquires the target sensible heat ratio SHF from the average indoor temperature Tave acquired by averaging the indoor temperatures Ta and Tb detected by the respective indoor temperature sensors 35a and 35b included in the respective indoor units 3a and 3b, the target indoor temperature Tm, and the target indoor humidity. Alternately, the controller 50 acquires the target sensible heat ratio SHF from the highest indoor temperature Tmax among the indoor temperatures Ta and Tb detected by the respective indoor temperature sensors 35a and 35b included in the respective indoor units 3a and 3b, the target indoor temperature Tm, and the target indoor humidity. Alternately, in the case where the temperature difference between the highest indoor temperature Tmax and the lowest indoor temperature Tm in among the indoor temperatures Ta and Tb detected by the respective indoor temperature sensors 35a and 35b included in the respective indoor units 3a and 3b is more than or equal to a predetermined value, the controller 50 acquires the target sensible heat ratio SHF from the highest indoor temperature Tmax, the target indoor temperature Tm, and the target indoor humidity.

The air-conditioning apparatus 100 according to Embodiment 3, which includes the multiple indoor units 3a and 3b, has the same effects as in Embodiment 1.

Embodiment 4

Embodiment 4 will be described below, where a description for a content common to Embodiment 1 to Embodiment 3 is omitted, and components that are the same as or correspond to the components in Embodiment 1 to Embodiment 3 are designated by the same reference signs.

The structure of an air-conditioning apparatus 100 according to Embodiment 4 is the same as the structure according to Embodiment 1 illustrated in FIG. 1 and is thus not described.

[Determination of Dehumidifying Operation Mode]

Figure 10:
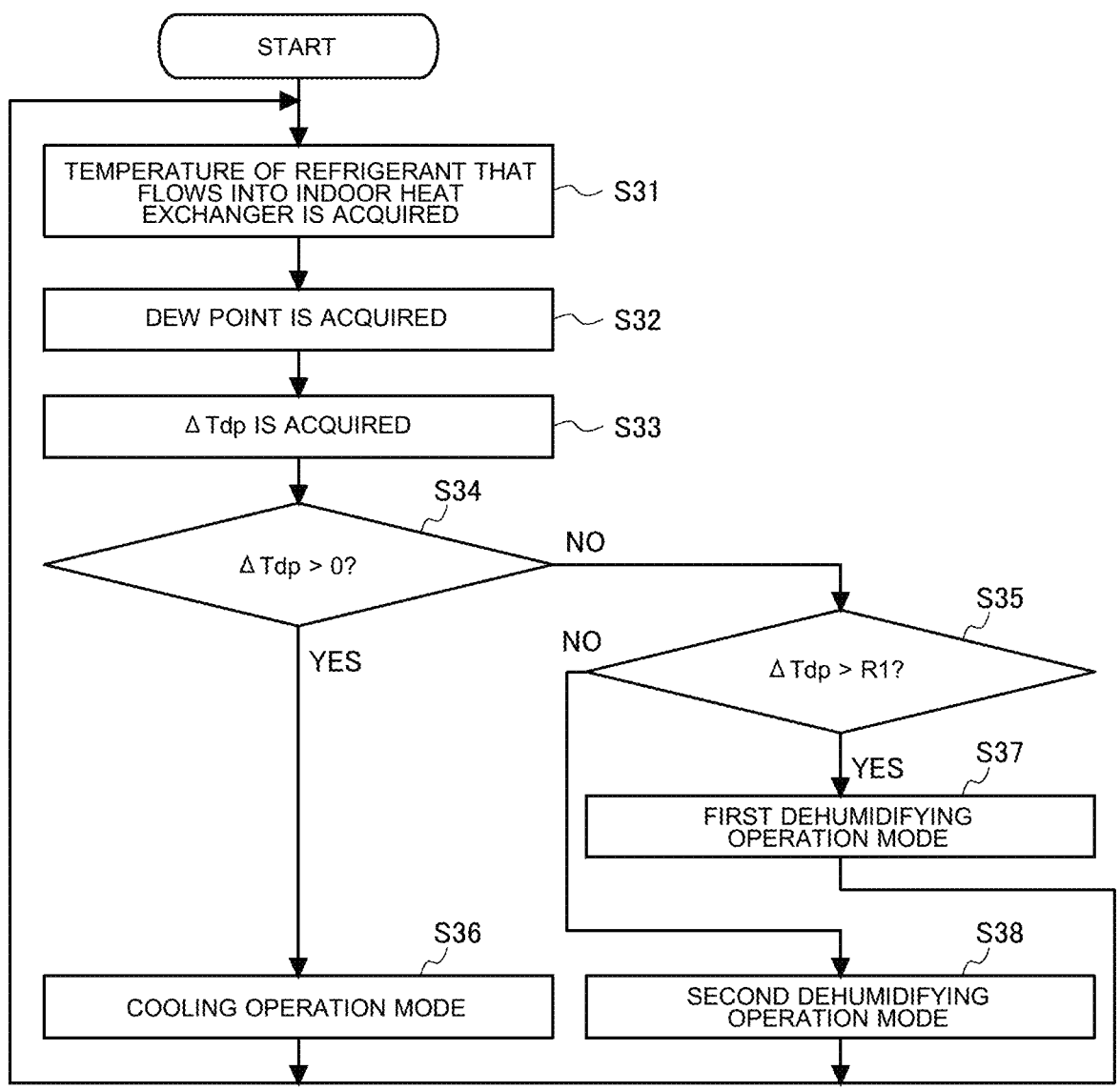
FIG. 10 is a flowchart for an air-conditioning apparatus according to Embodiment 4 when the cooling operation mode is changed into a dehumidifying operation mode.

FIG. 10 is a flowchart for the air-conditioning apparatus 100 according to Embodiment 4 when the cooling operation mode is changed into one of dehumidifying operation modes.

The dehumidifying operation modes of the air-conditioning apparatus 100 according to Embodiment 4 include the first dehumidifying operation mode and the second dehumidifying operation mode.

The flow of change from the cooling operation mode into one of the dehumidifying operation modes of the air-conditioning apparatus 100 according to Embodiment 4 will be described below with reference to FIG. 10.

(Step S31)

The controller 50 acquires the temperature of refrigerant that is detected by the entrance temperature sensor 36a and that flows into the indoor heat exchanger 31a. Subsequently, processing proceeds to step S32.

(Step S32)

The controller 50 acquires a dew point Tdp from the target indoor temperature Tm and the target indoor humidity. Subsequently, the processing proceeds to step S33.

(Step S33)

The controller 50 acquires a temperature difference ΔTdp between the dew point Tdp and the temperature of the refrigerant that is detected by the entrance temperature sensor 36a. Subsequently, the processing proceeds to step S34.

(Step S34)

The controller 50 determines whether the temperature difference ΔTdp is larger than 0. When the controller 50 determines that the temperature difference ΔTdp is larger than 0 (YES), the processing proceeds to step S36. On the other hand, when the controller 50 determines that the temperature difference ΔTdp is not larger than 0 (NO), the processing proceeds to step S35.

(Step S35)

The controller 50 determines whether the temperature difference ΔTdp is larger than a reference value R1 (<0). When the controller 50 determines that the temperature difference ΔTdp is larger than the reference value R1 (YES), the processing proceeds to step S37. On the other hand, when the controller 50 determines that the temperature difference ΔTdp is not larger than the reference value R1 (NO), the processing proceeds to step S38. The reference value R1 is, for example, 4 to 10, is determined depending on the dew point Tdp, and decreases as the dew point Tdp decreases.

(Step S36)

The controller 50 continues the cooling operation mode. Subsequently, the processing returns to step S31.

(Step S37)

The controller 50 changes the operation mode from the cooling operation mode into the first dehumidifying operation mode. Subsequently, the processing returns to step S31.

(Step S38)

The controller 50 changes the operation mode from the cooling operation mode into the second dehumidifying operation mode. Subsequently, the processing returns to step S31.

In the case where the temperature difference ΔTdp is larger than 0, the cooling operation mode continues, and in the case where the temperature difference ΔTdp is not larger than 0, the change into one of the dehumidifying operation modes is made as described above. Consequently, the evaporating temperature of the refrigerant that flows through the indoor heat exchanger 31a can be less than or equal to the dew point Tdp of the room with certainty.

The air-conditioning apparatus 100 according to Embodiment 4 described above includes the indoor unit 3a, which is installed in the indoor space and includes the indoor heat exchanger 31a, the indoor fan 33a, which sends the indoor air to the indoor heat exchanger 31a, and the entrance temperature sensor 36a, which detects the temperature of the refrigerant that flows into the indoor heat exchanger 31a, the outdoor unit 1, which is installed outside the indoor space described above and includes the compressor 11 and the outdoor heat exchanger 12, the refrigerant circuit in which the compressor 11, the outdoor heat exchanger 12, the expansion device 13, and the indoor heat exchanger 31a are connected by the pipes, and the controller 50 having the cooling operation mode in which the indoor space is cooled and the multiple dehumidifying operation modes in which the indoor space is dehumidified. The multiple dehumidifying operation modes include the first dehumidifying operation mode in which the air volume of the indoor fan 33a is increased or decreased and the second dehumidifying operation mode in which the compressor 11 alternates between operation and suspension. The controller 50 selects one of the multiple dehumidifying operation modes on the basis of the value of the temperature difference ΔTdp between the dew point Tdp acquired from the target indoor temperature Tm and the target indoor humidity and the temperature of the refrigerant that is detected by the entrance temperature sensor 36a when the cooling operation mode is changed into the one of the dehumidifying operation modes.

In the air-conditioning apparatus 100 according to Embodiment 4, the controller 50 selects one of the multiple dehumidifying operation modes on the basis of the value of the temperature difference ΔTdp between the dew point Tdp acquired from the target indoor temperature Tm and the target indoor humidity and the temperature of the refrigerant that is detected by the entrance temperature sensor 36a when the cooling operation mode is changed into the one of the dehumidifying operation modes. This enables the optimal possible dehumidifying operation mode for dehumidification to be selected, prevents the evaporating temperature from greatly decreasing, and enables dehumidification to be performed without reducing the user comfort.

In the air-conditioning apparatus 100 according to Embodiment 4, the controller 50 continues the cooling operation mode in the case where the temperature difference ΔTdp is larger than 0. The controller 50 changes the cooling operation mode into the first dehumidifying operation mode in the case where the temperature difference ΔTdp is larger than the reference value R1, which smaller than 0. The controller 50 changes the cooling operation mode into the second dehumidifying operation mode in the case where the temperature difference ΔTdp is not larger than the reference value R1.

The air-conditioning apparatus 100 according to Embodiment 4 continues the cooling operation mode in the case where the temperature difference ΔTdp is larger than 0 and makes a change into one of the dehumidifying operation modes in the case where the temperature difference ΔTdp is not larger than 0. This enables the evaporating temperature of the refrigerant that flows through the indoor heat exchanger 31a to be less than or equal to the dew point Tdp of the room with certainty.

REFERENCE SIGNS LIST

1: outdoor unit, 3a: indoor unit, 3b: indoor unit, 11: compressor, 12: outdoor heat exchanger, 13: expansion device, 14: flow switching device, 15: gas pipe, 16: liquid pipe, 31a: indoor heat exchanger, 31b: indoor heat exchanger, 32a: auxiliary heat exchanger, 33a: indoor fan, 33b: indoor fan, 34a: indoor fan motor, 34b: indoor fan motor, 35a: indoor temperature sensor, 35b: indoor temperature sensor, 36a: entrance temperature sensor, 36b: entrance temperature sensor, 37a: exit temperature sensor, 37b: exit temperature sensor, 38a: intermediate temperature sensor, 40: indoor expansion device, 50: controller, 100: air-conditioning apparatus, 121: outdoor fan, 122: outdoor fan motor

The invention claimed is:

1. An air-conditioning apparatus comprising:
an indoor unit including an indoor heat exchanger, an indoor fan configured to send indoor air to the indoor heat exchanger, and an indoor temperature sensor configured to detect an indoor temperature, the indoor unit being installed in an indoor space;
an outdoor unit including a compressor and an outdoor heat exchanger, the outdoor unit being installed outside the indoor space;
a refrigerant circuit in which the compressor, the outdoor heat exchanger, an expansion device, and the indoor heat exchanger are connected by a pipe; and
a controller having a cooling operation mode in which the indoor space is cooled and multiple dehumidifying operation modes in which the indoor space is dehumidified,
the multiple dehumidifying operation modes including a first dehumidifying operation mode in which an air volume of the indoor fan is increased or decreased and a second dehumidifying operation mode in which the compressor alternates between operation and suspension,
the controller being configured to, when the cooling operation mode is changed into one of the multiple dehumidifying operation modes, select the one of the multiple dehumidifying operation modes on the basis of a value of a sensible heat ratio difference ΔSHF that is a difference between a target sensible heat ratio acquired from the indoor temperature detected by the indoor temperature sensor, a target indoor temperature, and target indoor humidity and a theoretical minimum possible sensible heat ratio acquired from enthalpy of the indoor air, enthalpy of blown air from the indoor unit when relative humidity is 100%, and enthalpy of sensible heat.

2. The air-conditioning apparatus of claim 1,
wherein the controller is configured to, in the first dehumidifying operation mode,
determine the air volume of the indoor fan on the basis of the value of the sensible heat ratio difference ΔSHF, and
decrease the air volume of the indoor fan when the value of the sensible heat ratio difference ΔSHF decreases.

3. The air-conditioning apparatus of claim 1,
wherein the controller is configured to, in the second dehumidifying operation mode,
alternate between an ON mode and an OFF mode, a rotation frequency of the compressor being controlled for an ON time Δt1 such that the indoor temperature detected by the indoor temperature sensor approaches the target indoor temperature in the ON mode, the operation of the compressor being suspended for an OFF time Δt2 in the OFF mode, and determine a ratio between the ON time Δt1 and the OFF time Δt2 on the basis of the value of the sensible heat ratio difference ΔSHF.

4. The air-conditioning apparatus of claim 1,
wherein the indoor unit includes
an auxiliary heat exchanger disposed between the indoor heat exchanger and the expansion device, and
an indoor expansion device disposed between the indoor heat exchanger and the auxiliary heat exchanger, and
wherein the multiple dehumidifying operation modes include a third dehumidifying operation mode in which the indoor expansion device is opened or closed on the basis of the indoor temperature detected by the indoor temperature sensor.

5. The air-conditioning apparatus of claim 1,
wherein the controller is configured to
change the cooling operation mode into the first dehumidifying operation mode in a case where the sensible heat ratio difference ΔSHF is larger than a first reference value, and
change the cooling operation mode into the second dehumidifying operation mode in a case where the sensible heat ratio difference ΔSHF is not larger than the first reference value.

6. The air-conditioning apparatus of claim 4,
wherein the controller is configured to
change the cooling operation mode into the first dehumidifying operation mode in a case where the sensible heat ratio difference ΔSHF is larger than a first reference value,
change the cooling operation mode into the second dehumidifying operation mode in a case where the sensible heat ratio difference ΔSHF is not larger than the first reference value and is larger than a second reference value that is a value smaller than the first reference value, and
change the cooling operation mode into the third dehumidifying operation mode in a case where the sensible heat ratio difference ΔSHF is not larger than the second reference value.

7. The air-conditioning apparatus of claim 1,
wherein the air-conditioning apparatus comprises a plurality of the indoor units, and
wherein the plurality of the indoor units is connected to the outdoor unit by a pipe such that the plurality of the indoor units is in parallel with each other.

8. The air-conditioning apparatus of claim 7,
wherein the controller is configured to acquire the target sensible heat ratio from an average indoor temperature acquired by averaging indoor temperatures detected by the indoor temperature sensors included in the plurality of the indoor units, the target indoor temperature, and the target indoor humidity.

9. The air-conditioning apparatus of claim 7,
wherein the controller is configured to acquire the target sensible heat ratio from a highest indoor temperature of indoor temperatures detected by the indoor temperature sensors included in the plurality of the indoor units, the target indoor temperature, and the target indoor humidity.

10. The air-conditioning apparatus of claim 7,
wherein the controller is configured to, in a case where a temperature difference between a highest indoor temperature and a lowest indoor temperature of indoor temperatures detected by the indoor temperature sensors included in the plurality of the indoor units is more than or equal to a predetermined value, acquire the target sensible heat ratio from the highest indoor temperature, the target indoor temperature, and the target indoor humidity.

11. An air-conditioning apparatus comprising:
an indoor unit including an indoor heat exchanger, an indoor fan configured to send indoor air to the indoor heat exchanger, and an entrance temperature sensor configured to detect a temperature of refrigerant flowing into the indoor heat exchanger, the indoor unit being installed in an indoor space;
an outdoor unit including a compressor and an outdoor heat exchanger, the outdoor unit being installed outside the indoor space;
a refrigerant circuit in which the compressor, the outdoor heat exchanger, an expansion device, and the indoor heat exchanger are connected by a pipe; and
a controller having a cooling operation mode in which the indoor space is cooled and multiple dehumidifying operation modes in which the indoor space is dehumidified,
the multiple dehumidifying operation modes including a first dehumidifying operation mode in which an air volume of the indoor fan is increased or decreased and a second dehumidifying operation mode in which the compressor alternates between operation and suspension,
the controller being configured to, when the cooling operation mode is changed into one of the multiple dehumidifying operation modes, select the one of the multiple dehumidifying operation modes on the basis of a value of a temperature difference ΔTdp between a dew point acquired from a target indoor temperature and target indoor humidity and the temperature of the refrigerant detected by the entrance temperature sensor.

12. The air-conditioning apparatus of claim 11,
wherein the controller is configured to continue the cooling operation mode in a case where the temperature difference ΔTdp is larger than 0.

13. The air-conditioning apparatus of claim 12,
wherein the controller is configured to
change the cooling operation mode into the first dehumidifying operation mode in a case where the temperature difference ΔTdp is larger than a reference value that is a value smaller than 0, and
change the cooling operation mode into the second dehumidifying operation mode in a case where the temperature difference ΔTdp is not larger than the reference value.

* * * * *